INVENTORS
HAROLD C. STONE
BLAINE H. SCHULTZ
BY
Attorney

2,994,014
Patented July 25, 1961

2,994,014
SERIES CAPACITOR PROTECTIVE SYSTEMS

Harold C. Stone, Milwaukee, and Blaine H. Schultz, South Milwaukee, Wis., assignors to McGraw-Edison Company, Milwaukee, Wis., a corporation of Delaware
Filed Nov. 21, 1957, Ser. No. 697,963
3 Claims. (Cl. 317—12)

This invention relates to series capacitor protective systems.

When series capacitors are used the voltage across the terminals of the capacitors varies with the load that is imposed on the system as all of the current for each phase has to pass through the corresponding series capacitor. Obviously the higher the load the higher the voltage drop across the series capacitor terminals.

The usual method of protection is by the use of a calibrated spark gap bridged across the terminals of the capacitor, thereby securing protection for the capacitor itself. Nevertheless after a fault, whether permanent or transient, if the arcing at the spark gap persists for a material length of time, permanent damage to the gap may result.

Objects of this invention are to provide a system of protection for series capacitors so that the ordinary repeating circuit interrupter, for example for a three phase system, may be used and may be controlled by the current unbalance in a zero sequence relay circuit when one or more of the series capacitors is overloaded and arcing at the gap or gaps occurs.

Further objects are to provide a simple system of series capacitor protection which utilizes the ordinary well-known type of repeating polyphase circuit interrupter, and utilizes a trip coil on the polyphase circuit interrupter.

A specific object of this invention is to provide a system of protection for series capacitors which will detect the sparking over at any spark gap, which is so arranged that no combination of arcing spark gaps can occur which would prevent the tripping of the repeating circuit interrupter, and in which the repeating circuit interrupter retains all of its normal functions of protecting the system connected thereto.

Further objects are to provide a system of protection for series capacitors in which a polyphase circuit interrupter trips out whenever one or more of the spark gaps arcs over due to an unbalance in the load which thus produces an unbalance in a zero sequence relay circuit associated with the capacitors and spark gaps in such a manner that even though every spark gap arcs over simultaneously, nevertheless an unbalance is produced in the zero sequence relay circuit, and in which one or more spark gaps can arc over and will also produce an unbalance in the zero sequence relay circuit, so that in each instance tripping of the circuit interrupter will result and thereby will produce momentary extinguishing of the arc or arcs at the spark gaps.

Embodiments of the invention are shown in the accompanying drawings in which.

Figure 1:
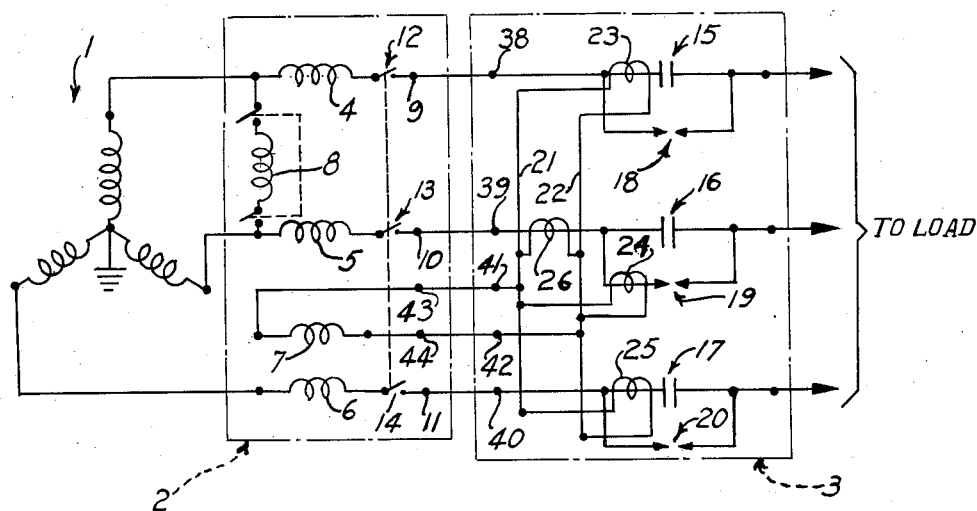
FIGURE 1 is a diagrammatic view showing one form of the invention.

Referring to FIGURE 1 it will be seen that a source of three phase current has been indicated generally by the reference character 1, and a repeating circuit interrupter by the reference character 2, and a series capacitor unit by the reference character 3. In the capacitor unit the capacitors are arranged in series in the corresponding lines between the source and the load.

The circuit interrupter indicated generally by the reference character 2 may be of the general type shown in the patent of Anthony Van Ryan and Kazuo Henry Date, No. 2,810,038, of October 15, 1957, for Circuit Interrupter, assigned to the same assignee as the present invention.

The circuit interrupter is provided with three series coils indicated by the reference characters, 4, 5 and 6, and is provided with a zero sequence coil indicated by the reference character 7. This circuit interrupter is spring opened and power reset, the reset coil being indicated by the reference character 8 in FIGURE 1.

The main output power terminals, of the circuit interrupter, are indicated for several phases by the reference characters 9, 10 and 11 respectively. The switches for simultaneously interrupting the power current flow are indicated by the reference characters 12, 13 and 14 respectively, and are opened automatically when one or more of the series coils is sufficiently energized to trip the circuit interrupter or when the ground fault zero sequence coil is sufficiently energized to trip the circuit interrupter as set forth in detail in the above noted patent.

When the circuit interrupter is opened the reset coil 8 is energized and the circuit interrupter is reclosed against the action of a spring as described in the aforementioned patent.

Series capacitors are coming into more and more general use. These series capacitors are connected directly in series with the power lines on the load side of the system as shown in FIGURE 1. In order to protect these series capacitors against overload under all conditions a spark gap is shunted across each individual capacitor.

The series capacitors for the first, second and third phases are indicated respectively by the reference characters 15, 16 and 17. Their bridging or shunting spark gaps are indicated respectively by the reference characters 18, 19 and 20.

The zero sequence trip coil 7 is connected between the conductors 21 and 22. The conductors 21 and 22 are connected to current transformers 23, 25 and 26, and to an extra current transformer 24. The secondaries of these transformers are connected in parallel to the conductors 21 and 22, as shown in FIGURE 1. Normally the net secondary or unbalance current caused by normal load unbalance is insufficient to cause the ground trip zero sequence coil to trip the recloser. If desired, these transformers may have the same turns ratio.

It sometimes happens that a transient current caused by ferroresonance, surges, or temporary faults will result though this line current will immediately return to normal. The ground fault detector and series coils will not cause operation of the circuit interrupter because the ground fault detector requires an unbalance current and the series coils require high sustained current. However, the spark gaps continue to arc over. This invention, however, will take care of this unusual condition for under this condition the current transformers 23, 25 and 26, will be unbalanced, and thus trip the circuit interrupter and cause interruption of the current with consequent extinguishing of the arcs at the spark gaps.

On the other hand, if a single spark gap arcs over, for example the gap for the first circuit, the transformer 23 will have zero current in its secondary and will cause an unbalance and tripping of the circuit interrupter.

If the second gap should arc over, the secondary of the transformer 24 will come into play as well as that of the transformer 26, so that the sum of the effect of these two transformers for the second gap will cause the unbalance.

On the other hand, if the third gap should arc over, the secondary of the transformer 25 will have zero current and will cause the unbalance.

Under all possible conditions, even when all of the gaps arc over and carry equal current an unbalance will be produced as has been indicated hereinabove with consequent tripping of the circuit interrupter.

Figure 2:
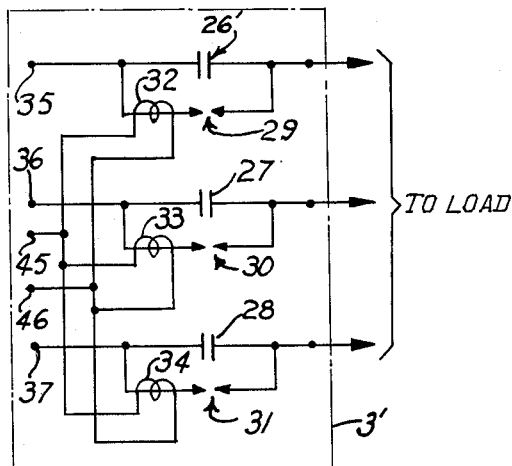
FIGURE 2 is a diagrammatic view showing a portion of a further form of the invention.

Referring to FIGURE 2 it will be seen that the series capacitors are indicated by the reference characters 26', 27 and 28, respectively, for the first, second and third phases. These capacitors are respectively bridged by the spark gaps 29, 30 and 31. However, in this form of the invention, the current transformers are placed in the circuit of the respective spark gaps, and are indicated by the reference characters 32, 33 and 34. One of the transformers has a different ratio from the others, for example the transformer 34 may have half the number of turns in its secondary as either of the other two, the other two transformers 32 and 33 may be equal if so desired. In this way it is possible to secure tripping of the circuit interrupter although all three gaps may arc over at the same time on a balanced fault, since under these conditions there will necessarily be an unbalance due to the fact that one of the three current transformers has a different turn ratio from the others.

On the other hand, if one or two of the spark gaps arcs over, an unbalance will be produced since the third current transformer carries no current whatsoever.

Therefore, under all conditions an unbalance is produced if one, two or three of the spark gaps should arc over.

When the device shown in FIGURE 2 is employed, it is apparent that the power line terminals 35, 36 and 37 are connected to the terminals 9, 10 and 11 of the circuit interrupter 2. The zero sequence terminals indicated by the reference characters 43 and 44 of FIGURE 1, and 45 and 46 of FIGURE 2, are connected.

It will be seen that a series capacitor protective system has been disclosed which is relatively simple and which is thoroughly reliable in operation. It is apparent also that the series capacitor unit with its spark gaps whether in the form indicated by the reference character 3 in FIGURE 1 or the reference character 3' in FIGURE 2 may be readily connected to the repeating circuit interrupter indicated by the reference character 2 so as to cause interruption of the circuit upon arcing of any one or more of the protective gaps for the several capacitors.

Although the invention has been described in considerable detail, it is to be understood that this description is intended as illustrative and not as limiting, as the invention may be variously embodied and is to be interpreted as claimed.

I claim:

1. In a polyphase series capacitor protective system, a polyphase source, power means for opening each phase, a trip coil operatively mechanically connected to said power means for tripping said power means, a unit for each phase consisting of a series capacitor connected in a circuit in series in each phase, and a spark gap bridged around the capacitor, a zero sequence circuit including a current transformer for each phase with each current transformer inductively coupled to the individual circuit of the corresponding unit, said zero sequence circuit including means for causing an unbalance when all of said spark gaps arc over at the same time, said zero sequence circuit arranged to cause an unbalance when one spark gap arcs over or when two spark gaps arc over simultaneously, and means coupling said unbalance signal to said trip coil.

2. In a polyphase series capacitor protective system, a source of polyphase power, an output line for each phase, a series capacitor connected in series in each output line, a spark gap connected in a local circuit and bridged across each capacitor, a current transformer for each phase having a primary and a secondary with the primary connected in the local spark gap line, a pair of conductors with the secondary of each current transformer connected across from one conductor to the other conductor, said source of polyphase power having a trip coil, and means for energizing said trip coil from said pair of conductors, one of said current transformers having a turns ratio different from the other two current transformers.

3. In a polyphase series capacitor protective system, a polyphase source, power means for opening each phase, a trip coil operatively mechanically connected to said power means for tripping said power means, a unit for each phase consisting of a series capacitor connected in a circuit in series in each phase, and a spark gap connected in a local circuit one bridged across each capacitor, a zero sequence circuit including a plurality of current transformers each having a primary and a secondary, with the primary of two of said transformers connected in series with the capacitor in two of said local circuits, the primary of a third connected in series with the remaining local circuit, the primary of a fourth transformer connected in series with the spark gap in said remaining local circuit, and means connecting the secondaries of all said current transformers in parallel with each other and with said trip coil.

References Cited in the file of this patent

UNITED STATES PATENTS

| | | |
|---|---|---|
| 1,413,093 | Bendmann | Apr. 18, 1922 |
| 2,144,503 | Marbury | Jan. 17, 1939 |
| 2,569,133 | Podolsky | Sept. 25, 1951 |
| 2,888,613 | Cuttino | May 26, 1959 |